United States Patent
Oh et al.

(10) Patent No.: US 12,286,578 B2
(45) Date of Patent: Apr. 29, 2025

(54) LIQUID CRYSTALLINE RESIN COMPOSITION AND BALL BEARING SLIDING PARTS MANUFACTURED USING THE SAME

(71) Applicants: SAMSUNG ELECTRO-MECHANICS CO., LTD., Suwon-si (KR); SEYANG POLYMER CO., LTD., Incheon (KR)

(72) Inventors: Namkeun Oh, Suwon-si (KR); Jung Hyun Park, Suwon-si (KR); Dohwan Kim, Suwon-si (KR); Donghoon Lee, Suwon-si (KR); Sanghyun Ji, Suwon-si (KR); Dooseub Shin, Suwon-si (KR); Ju Ho Kim, Suwon-si (KR); Jin Kyu Lee, Hwaseong-si (KR); Sang Don Lee, Seoul (KR); Sueng Bin Song, Anseong-si (KR)

(73) Assignees: Samsung Electro-Mechanics Co., Ltd., Suwon-si (KR); SEYANG POLYMER CO., LTD., Incheon (KR)

( * ) Notice: Subject to any disclaimer, the term of this patent is extended or adjusted under 35 U.S.C. 154(b) by 0 days.

(21) Appl. No.: 18/340,130

(22) Filed: Jun. 23, 2023

(65) Prior Publication Data
US 2024/0218253 A1 Jul. 4, 2024

(30) Foreign Application Priority Data
Dec. 29, 2022 (KR) .................. 10-2022-0188160

(51) Int. Cl.
| G02F 1/1333 | (2006.01) |
| B82Y 30/00 | (2011.01) |
| C09K 19/04 | (2006.01) |
| C09K 19/52 | (2006.01) |

(52) U.S. Cl.
CPC .............. *C09K 19/52* (2013.01); *B82Y 30/00* (2013.01); *C09K 19/0403* (2013.01); *C09K 2019/521* (2013.01)

(58) Field of Classification Search
CPC ...... C09K 2019/521; C09K 2019/3809; G02F 1/1333
See application file for complete search history.

(56) References Cited

U.S. PATENT DOCUMENTS

| 2011/0089371 A1 | 4/2011 | Murouchi et al. |
| 2011/0114883 A1 | 5/2011 | Murouchi et al. |
| 2012/0235092 A1 | 9/2012 | Sekimura et al. |
| 2013/0015401 A1 | 1/2013 | Matsubara et al. |
| 2013/0253118 A1 | 9/2013 | Shiraishi et al. |
| 2018/0334534 A1 | 11/2018 | Matsubara et al. |
| 2019/0233582 A1 | 8/2019 | Tsuchiya et al. |
| 2021/0332228 A1* | 10/2021 | Yang ........................ B29B 7/286 |
| 2022/0204852 A1 | 6/2022 | Ha et al. |
| 2022/0380675 A1 | 12/2022 | Maruo et al. |
| 2024/0218253 A1* | 7/2024 | Oh .......................... C09K 19/52 |

FOREIGN PATENT DOCUMENTS

| JP | 7043159 B1 | 3/2022 |
| KR | 10-1305878 B1 | 9/2013 |
| KR | 10-1537109 B1 | 7/2015 |
| KR | 10-1591541 B1 | 2/2016 |
| KR | 10-1591542 B1 | 2/2016 |
| KR | 10-1625009 B1 | 5/2016 |
| KR | 10-1646212 B1 | 8/2016 |
| KR | 10-1783505 B1 | 9/2017 |
| KR | 10-1813426 B1 | 12/2017 |
| KR | 10-1831543 B1 | 2/2018 |
| KR | 10-1832120 B1 | 2/2018 |
| KR | 10-1848934 B1 | 4/2018 |
| KR | 10-2018-0077187 A | 7/2018 |
| KR | 10-1907100 B1 | 10/2018 |
| KR | 10-2019-0091208 A | 8/2019 |
| KR | 10-2062267 B1 | 1/2020 |
| KR | 10-2081231 B1 | 2/2020 |
| KR | 10-2132804 B1 | 7/2020 |
| KR | 10-2020-0132709 A | 11/2020 |
| KR | 10-2323582 B1 | 11/2021 |
| KR | 10-2022-0045082 A | 4/2022 |
| KR | 10-2022-0095374 A | 7/2022 |
| KR | 10-2022-0115088 A | 8/2022 |
| WO | WO 2021/065416 A1 | 4/2021 |

OTHER PUBLICATIONS

Korean Office Action Issued on Feb. 12, 2025, in Counterpart Korean Patent Application No. 10-2022-0188160 (7 Pages in English, 7 Pages in Korean).

* cited by examiner

*Primary Examiner* — Geraldina Visconti
(74) *Attorney, Agent, or Firm* — NSIP Law

(57) ABSTRACT

A liquid crystalline resin composition is disclosed. The liquid crystalline resin composition includes a liquid crystalline resin, a fine particulate filler including barium sulfate ($BaSO_4$), and a nanofiller including carbon nanotubes (CNT), wherein a content of the nanofiller based on the total weight of the fine particulate filler and the nanofiller is about 6 wt % to about 30 wt %.

15 Claims, 2 Drawing Sheets

LIQUID CRYSTALLINE RESIN COMPOSITION AND BALL BEARING SLIDING PARTS MANUFACTURED USING THE SAME

This application claims the benefit under 35 USC § 119(a) of Korean Patent Application No. 10-2022-0188160 filed on Dec. 29, 2022 in the Korean Intellectual Property Office, the entire contents of which are incorporated herein by reference for all purposes.

BACKGROUND

1. Field

The following description relates to a liquid crystalline resin composition and a ball bearing sliding part manufactured using the same.

2. Description of Related Art

Liquid crystalline resins, represented by liquid crystalline polyester resins, have excellent mechanical strength, heat resistance, chemical resistance, electrical properties, etc. in a well-balanced manner, and additionally, have excellent dimensional stability and thus are widely used as high-performance engineering plastics.

Liquid crystalline resins may also be implemented in precision instrument parts. Examples of the parts implementing the liquid crystalline resins include, as examples, connectors such as Flexible Printed Circuit or Cable (FPC) connectors and the like, sockets such as memory card sockets and the like, parts for camera modules such as lens holders and the like, or relays. It is desirous that these parts have excellent surface-whitening inhibition, low warpage properties, weld strength, and low dust generation.

Additionally, since two or more members are typically used to dynamically contact each other, sliding abrasion properties (i.e., easily worn properties of two or more members when dynamically contacting each other) should also be reduced.

Among the aforementioned parts, a ball bearing sliding part used to dynamically contact a ball bearing with a molded article formed of a liquid crystalline resin composition is particularly desirous to reduce the sliding abrasion properties (i.e., easily worn properties when it is in dynamical contact with the ball bearing).

Additionally, the ball bearing sliding part, which is easily scratched, cracked, dented, etc. when impacted, may bring about defects in the dynamic contact between the ball bearing sliding part and the ball bearing.

Accordingly, it is also desirous that the ball bearing sliding part have improved impact resistance against drop deformation, that is, improved characteristics against scratches, cracks, dents, etc. despite impacts.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a liquid crystalline resin composition includes a liquid crystalline resin; a fine particulate filler comprising barium sulfate ($BaSO_4$); and a nanofiller comprising carbon nanotubes (CNT), wherein a content of the nanofiller based on a total weight of the fine particulate filler and the nanofiller is about 6 wt % to about 30 wt %.

The liquid crystalline resin composition may include the liquid crystalline resin in an amount of about 60 wt % to about 85 wt % based on a total weight of the liquid crystalline resin composition.

The liquid crystalline resin composition may include the fine particulate filler and the nanofiller in an amount of about 7.5 wt % to about 15 wt % based on a total weight of the liquid crystalline resin composition.

A median diameter of the fine particulate filler may be about 0.4 μm to about 1.5 μm.

The fine particulate filler may include silica, quartz powders, glass beads, glass powders, calcium silicate, aluminum silicate, potassium aluminum silicate, kaolin, clay, diatomite, wollastonite, iron oxide, titanium oxide, zinc oxide, alumina, calcium carbonate, magnesium carbonate, calcium sulfate, silicon carbide, silicon nitride, boron nitride, potassium titanate, calcium pyrophosphate, anhydrous dibasic calcium phosphate, or a combination thereof.

The nanofiller may have a median diameter of about 5 nm to about 20 nm, and a length of about 40 μm to about 100 μm.

The liquid crystalline resin composition may further include a sheet-shaped filler in an amount of about 1 wt % to about 30 wt % based on a total weight of the liquid crystalline resin composition.

The sheet-shaped filler may include mica, glass flakes, metal flakes, or a combination thereof.

A median diameter of the sheet-shaped filler may be about 10 μm to about 60 μm.

The liquid crystalline resin composition may further include an olefin-based copolymer in an amount of about 2 wt % to about 15 wt % based on a total weight of the liquid crystalline resin composition.

The olefin-based copolymer may be a copolymer including a repeating unit derived from an α-olefin and a repeating unit derived from a glycidyl ester of an α,β-unsaturated acid.

The liquid crystalline resin composition may further include a carbon-based filler in an amount of about 0.5 wt % to about 5 wt % based on a total weight of the liquid crystalline resin composition.

The carbon-based filler may include carbon black.

The liquid crystalline resin composition may further include an abrasive filler including molybdenum disulfide ($MoS_2$), molybdenum diselenide ($MoSe_2$), molybdenum sulfide selenide (MoSSe), molybdenum trioxide ($MoO_3$), tungsten disulfide ($WS_2$), tungsten selenide ($WSe_2$), tungsten selenide sulfide (WSSe), tungsten trioxide ($MoO_3$), or a combination thereof in an amount of about 0.5 wt % to about 5 wt % based on a total weight of the liquid crystalline resin composition.

Other features and aspects will be apparent from the following detailed description, the drawings, and the claims.

Figure 1:
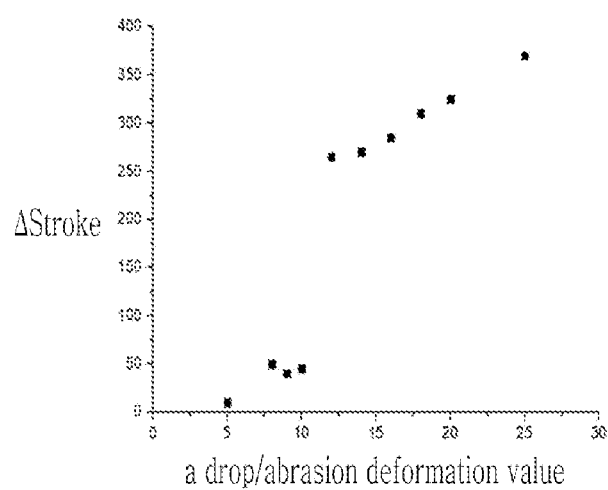
FIG. 1 is a graph showing a correlation between a drop/abrasion deformation value and a driving performance value (Stroke), in accordance with one or more embodiments.

Throughout the drawings and the detailed description, unless otherwise described or provided, the same drawing reference numerals may understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure. For example, the sequences of operations described herein are merely examples, and are not limited to those set forth herein, but may be changed as will be apparent after an understanding of the disclosure, with the exception of operations necessarily occurring in a certain order. Also, descriptions of features that are known after an understanding of the disclosure may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure. Terms, such as those defined in commonly used dictionaries, are to be interpreted as having a meaning that is consistent with their meaning in the context of the relevant art and the disclosure and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Throughout the specification, "stacked direction" refers to a direction in which constituent elements are sequentially stacked, and may also be a "thickness direction" perpendicular to the wide surface (main surface) of the constituent elements on the sheet, which corresponds to a T-axis direction in the drawings. Additionally, "lateral direction" refers to a direction extending parallel to the wide surface (main surface) from the edge of the sheet-like constituent element, and may be "planar direction," which corresponds to s L-axis direction in the drawings.

One or more examples provide a liquid crystalline resin composition that has excellent resistance to drop deformation and abrasion deformation, and can prevent deterioration in driving performance due to drop deformation and abrasion deformation of ball bearing sliding parts.

In an example, the liquid crystalline resin composition may have improved resistance to drop deformation and abrasion deformation and thus a decrease in driving performance due to drop deformation and abrasion deformation of a ball bearing sliding part may be prevented.

A liquid crystalline resin composition according to an embodiment includes a liquid crystalline resin, a fine particulate filler, and a nanofiller.

A liquid crystalline resin is a melt-processable polymer having a property of forming an optically anisotropic molten phase. The properties of the anisotropic molten phase may be confirmed by a typical polarization inspection method using an orthogonal polarizer. More specifically, confirmation of the anisotropic molten phase may be performed by observing a molten sample placed on a Leitz hot stage at a magnification of 40 times in a nitrogen atmosphere using a Leitz polarization microscope. When the liquid crystalline polymer is inspected between orthogonal polarizers, and for example, polarized light is normally transmitted even in a melt-stopped state, and it may exhibit optical anisotropy.

The type of liquid crystalline resin is not particularly limited, and may be an aromatic polyester and/or an aromatic polyesteramide. Moreover, a polyester which partially contains an aromatic polyester and/or an aromatic polyesteramide in the same molecular chain may be used. The liquid crystalline resin, when dissolved in pentafluorophenol at 60° C. at a concentration of 0.1 mass %, will have a logarithmic viscosity (I.V.) of, for example, at least about 2.0 dl/g, or from about 2.0 dl/g to about 10.0 dl/g.

In an example, the liquid crystalline resin may be an aromatic polyester or an aromatic polyesteramide having a repeating unit that is derived from an aromatic hydroxycarboxylic acid, an aromatic hydroxyamine, or an aromatic diamine as a constituent component, and may include, for example, a polyester mainly composed of repeating units derived from an aromatic hydroxycarboxylic acid or a derivative thereof; a polyester mainly composed of a repeating unit derived from an aromatic hydroxycarboxylic acid or a derivative thereof, and a repeating unit derived from an aromatic dicarboxylic acid, an alicyclic dicarboxylic acid, or a derivative thereof; a polyester mainly composed of a repeating unit derived from an aromatic hydroxycarboxylic acid or a derivative thereof, a repeating unit derived from an aromatic dicarboxylic acid, an alicyclic dicarboxylic acid, or a derivative thereof, and a repeating unit derived from an aromatic diol, an alicyclic diol, an aliphatic diol, or a derivative thereof; a polyester amide mainly composed of a repeating unit derived from an aromatic hydroxycarboxylic acid or a derivative thereof, a repeating unit derived from an aromatic hydroxyamine, an aromatic diamine, or a derivative thereof, and a repeating unit derived from an aromatic dicarboxylic acid, an alicyclic dicarboxylic acid, or a derivative thereof; or a polyesteramide mainly composed of a repeating unit derived from an aromatic hydroxycarboxylic acid or a derivative thereof, a repeating unit derived from an aromatic hydroxyamine, an aromatic diamine, or a derivative thereof, and an aromatic dicarboxylic acid, an alicyclic dicarboxylic acid, or a derivative thereof, and a repeating unit derived from an aromatic diol, an alicyclic diol, an aliphatic diol, or a derivative thereof.

Additionally, specific compounds constituting the liquid crystalline resin may include, as only examples, an aromatic hydroxycarbonic acid such as p-hydroxybenzoic acid and 6-hydroxy-2-naphthoic acid, 2,6-dihydroxynaphthalene, aromatic diol such as 1,4-dihydroxynaphthalene, 4,4'-dihydroxybiphenyl, hydroquinone, or resorcin, an aromatic dicarbonic acid such as terephthalic acid, isophthalic acid, 4,4'-diphenyldicarboxylic acid, or 2,6-naphthalenedicarboxylic acid, or an aromatic amine such as p-aminophenol or p-phenylenediamine.

The liquid crystalline resin may be prepared by a typical method using direct polymerization or transesterification from monomers, and may usually be prepared by a method such as melt polymerization, solution polymerization, slurry polymerization, or solid phase polymerization.

A compound that achieves esterification may be used for polymerization in its original form, or it may be modified into a derivative that achieves esterification from a precursor before polymerization. A catalyst may be used during polymerization and may include, as examples, a metal salt-based catalyst such as potassium acetate, magnesium acetate, stannous acetate, tetrabutyl titanate, lead acetate, sodium acetate, antimony trioxide, cobalt(III) tris(2,4-pentanedionate), or an organic compound-based catalyst such as N-methylimidazole and 4-dimethylaminopyridine. An amount of catalyst used may be about 0.001 wt % to about 1 wt %, or about 0.01 wt % to about 0.2 wt %, based on the total weight of the monomers. The polymer prepared by polymerization may, if necessary, increase its molecular weight by solid-phase polymerization by heating under reduced pressure or in an inert gas.

The liquid crystalline resin may be included in an amount of about 60 wt % to about 85 wt %, for example about 65 wt % to about 80 wt %, based on the total weight of the liquid crystalline resin composition. If the content of the liquid crystalline resin is less than about 60 wt %, fluidity may be deteriorated, appearance may be poor, sliding abrasion properties may be deteriorated, and if it exceeds about 85 wt %, dust generation may increase and dimensional stability may deteriorate.

The fine particulate filler may include barium sulfate ($BaSO_4$).

The barium sulfate may be precipitated barium sulfate artificially synthesized with barium sulfate (balite powder) obtained by crushing a mineral called barite. A particle size of precipitated barium sulfate may be controlled by conditions during synthesis.

The fine particulate filler may further include, as examples, silica, quartz powder, glass beads, glass powder, calcium silicate, aluminum silicate, potassium aluminum silicate, kaolin, clay, diatomaceous earth, wollastonite, iron oxide, titanium oxide, zinc oxide, alumina, calcium carbonate, magnesium carbonate, calcium sulfate, silicon carbide, silicon nitride, boron nitride, potassium titanate, calcium pyrophosphate, anhydrous dicalcium phosphate, or a combination thereof, together with barium sulfate.

In a non-limited example, the median diameter of the fine particulate filler may be about 0.4 μm to about 1.5 μm, for example about 0.5 μm to about 1.0 μm. When the median diameter of the fine particulate filler is within the above range, the friction coefficient during sliding may be further reduced. The particle diameter of the fine particulate filler may be measured by a laser diffraction scattering method, and the particle diameter at a 50% cumulative volume basis of the particle size distribution measured by the laser diffraction scattering method is the median diameter (D50). The particle diameter (D50) at a 50% volume-based cumulative is a particle diameter at the point where the cumulative value is 50% when calculating the particle size distribution based on volume and counting the number of particles from the smallest particle size on the cumulative curve with the total volume as 100%.

The fine particulate filler may be spherical. The shape of the fine particulate filler may be analyzed, for example, by scanning electron microscope (SEM) observation.

The fine particulate filler may be surface treated. In an example, a surface treatment agent of the fine particulate filler may be a coating agent, a dispersing agent, or a modifier, and the like, for example, a fatty acid, a wax, a nonionic surfactant, an epoxy compound, an isocyanate compound, a silane compound, a titanate compound, a phosphorus compound, an aluminum salt such as alumina, a silicate such as silicon dioxide, or a titanium salt such as titanium dioxide.

The nanofiller includes carbon nanotubes (CNT).

The nanofiller may have a median diameter of about 5 nm to about 20 nm and a length of about 40 μm to about 100 μm, for example, a median diameter of about 11 μm to about 13 μm and a length of about 40 μm to about 50 μm.

In an example, the liquid crystalline resin composition may include about 7.5 wt % to about 15 wt %, for example about 7 wt % to about 16 wt %, of the fine particulate filler and the nanofiller, based on the total weight of the liquid crystalline resin composition. When the content of the fine particulate filler and the nanofiller is less than about 7.5 wt %, dust generation may increase and dimensional stability may deteriorate, and when it exceeds about 15 wt %, fluidity may decrease, appearance may be poor, and sliding abrasion properties may be lowered.

The liquid crystalline resin composition may include about 6 wt % to about 30 wt %, for example, about 7 wt % to about 23 wt % of the nanofiller based on the total weight of the fine particulate filler and the nanofiller. When the content of the nanofiller is less than about 6 wt % based on the total weight of the fine particulate filler and the nanofiller, sliding abrasion properties property may be reduced and dust generation may be increased, and when it exceeds about 30 wt %, fluidity may be lowered and the appearance may be deteriorated.

Optionally, the liquid crystalline resin composition may further include a sheet-shaped filler.

In an example, the sheet-shaped filler may include mica, glass flakes, metal flakes, or a combination thereof. The mica may suppress warpage deformation of a molded article obtained from the liquid crystalline resin composition without deteriorating the fluidity of the liquid crystalline resin composition.

In an example, the mica may be a pulverized product of a silicate mineral, including aluminum, potassium, magnesium, sodium, and iron. In an example, the mica may be muscovite mica, phlogopite mica, biotite, or artificial mica, among which muscovite mica has a good color and is inexpensive.

The mica may be prepared by pulverizing minerals, and for example, a wet pulverizing method or a dry pulverizing method may be used. The wet pulverizing method is a method of coarsely pulverizing raw mica with a dry pulverizer, adding water to pulverize the raw mica by wet pulverization in a slurry state, followed by dehydration and drying. Compared to the wet pulverizing method, the dry pulverizing method is cheaper, but when using the wet pulverizing method, minerals may be pulverized thinly and finely.

Additionally, in the example of using the wet pulverizing method, since a step of dispersing the material to be pulverized is necessary in water, an agglomeration sedimentation agent or sedimentation aid may be added to the material to be ground in order to increase dispersion efficiency of the material to be pulverized. The agglomeration sedimentation agent and sedimentation aid may include polyaluminum chloride, aluminum sulfate, ferrous sulfate, ferric sulfate, chlorinated copperas, polyferric sulfate, polyferric chloride, an iron-silica inorganic polymer coagulant, a ferric chloride-silica inorganic polymer coagulant, slaked lime ($Ca(OH)_2$), caustic soda (NaOH), or sodium carbonate ($Na_2CO_3$).

In an example, the median diameter of the sheet-shaped filler may be about 10 μm to about 60 μm, for example about 18 μm to about 38 μm. When the median diameter of the sheet-shaped filler is less than about 10 μm, dimensional stability may be deteriorated, and when it exceeds about 60 μm, appearance may be deteriorated.

The liquid crystalline resin composition may include the sheet-shaped filler in an amount of about 1 wt % to about 30 wt %, for example, about 2 wt % to about 25 wt %, based on the total weight of the liquid crystalline resin composition. If the content of the sheet-shaped filler is less than 1 wt %, a surface hardness of the molded article increases, and when the molded article is subjected to impact, scratches, cracks, and dents may be likely to occur, and the sliding abrasion properties of the ball bearing may be lowered, and if it exceeds about 30 wt %, surface whitening of the molded article may occur.

Optionally, in an example, the liquid crystalline resin composition may further include an olefin-based copolymer.

The olefin-based copolymer may improve the impact resistance of the liquid crystalline resin composition against external impact. The olefin-based copolymer may be a copolymer composed of a repeating unit derived from α-olefin and a repeating unit derived from glycidyl esters of an α,β-unsaturated acid. The α-olefin may be ethylene, propylene, or butene, etc., and the glycidyl ester of an α,β-unsaturated acid may be glycidyl acrylate ester, glycidyl methacrylate ester, or glycidyl ethacrylate ester.

The liquid crystalline resin composition may include the olefin-based copolymer in an amount of about 2 wt % to about 15 wt %, or about 3 wt % to about 10 wt %, based on the total weight of the liquid crystalline resin composition. When the content of the olefin-based copolymer is less than about 2 wt %, dust generation may increase, and when it exceeds about 15 wt %, physical properties may be deteriorated and appearance may be inferior.

Optionally, the liquid crystalline resin composition may further include a carbon-based filler including carbon black.

The carbon black is not particularly limited as long as it is generally available for use in resin coloring. Typically, the carbon black includes secondary particles formed by aggregation of primary particles. However, unless a significant amount of secondary particles with a size greater than or equal to about 50 μm is included, fine protrusions may not be generated on the surface of a molded article manufactured by molding a liquid crystalline resin composition. In an example, the content rate of secondary particles having a particle diameter of greater than or equal to about 50 μm may be less than or equal to about 20 ppm, or less than or equal to about 5 ppm.

The liquid crystalline resin composition may include about 0.5 wt % to about 5 wt %, or about 1 wt % to about 5 wt %, of the carbon-based filler based on the total weight of the liquid crystalline resin composition. If the content of the carbon-based filler is less than about 0.5 wt %, coloring of the liquid crystalline resin composition may be deteriorated, and if it exceeds about 5 wt %, it is uneconomical and fine protrusions may be generated on the surface of the molded article.

Optionally, the liquid crystalline resin composition may further include an abrasive filler.

In an example, the abrasive filler may include a sulfide, selenide, or oxide of chromium (Cr), molybdenum (Mo), or tungsten (W), for example, molybdenum disulfide ($MoS_2$), molybdenum diselenide ($MoSe_2$), molybdenum sulfide selenide (MoSSe), molybdenum trioxide ($MoO_3$), tungsten disulfide ($WS_2$), tungsten selenide ($WSe_2$), tungsten selenide sulfide (WSSe), tungsten trioxide ($WO_3$), or a combination thereof.

The abrasive filler has a layered structure in which, for example, layers of a metal such as chromium (Cr), molybdenum (Mo), or tungsten (W) are sandwiched between two layers of sulfur, and a weak Van der Waals force acts between the layers, making it easy to slip and it may act as a lubricant due to a low friction coefficient.

The liquid crystalline resin composition may include about 0.5 wt % to about 5 wt %, or about 1 wt % to about 3 wt %, of the abrasive filler based on the total weight of the liquid crystalline resin composition. When the content of the abrasive filler is less than about 0.5 wt %, dust generation may increase and sliding abrasion properties may decrease, and when it exceeds about 5 wt %, the appearance may be deteriorated and physical properties may be deteriorated.

Optionally, the liquid crystalline resin composition may include other fillers, generally known additives added to synthetic resins, that is, stabilizers such as antioxidants and ultraviolet absorbers, antistatic agents, flame retardants, colorants such as dyes and pigments, lubricants, release agents, and crystallization accelerators, to the extent that the desired effect is not impaired and other components such as crystal nucleating agents may also be appropriately added according to a desired performance. In an example, the other fillers may be particulate fillers such as gypsum (potassium sulfate dihydrate), a sheet-shaped filler such as talc, or a fibrous filler such as whiskers.

The preparing method of the liquid crystalline resin composition is not specifically limited. In an example, the liquid crystalline resin composition may be prepared by blending the liquid crystalline resin and fillers and subjecting them to melt kneading using a single-screw or twin-screw extruder.

The liquid crystalline resin composition may have a melt viscosity of less than or equal to about 90 Pa·s, or less than or equal to about 80 Pa·s, from the viewpoint of flowability and moldability during melting. The melt viscosity may be obtained by an ISO 11443-compliant measurement method under the conditions of a cylinder temperature that is 10° C. to 20° C. higher than the melting point of the liquid crystalline resin and a shear rate of 1000 s$^{-1}$.

A ball bearing sliding part, in accordance with one or more embodiments, may be manufactured using the aforementioned liquid crystalline resin composition.

The ball bearing sliding part may have improved resistance to drop deformation and abrasion deformation, and at the same time, may have suppression of surface whitening, low warpage properties, excellent weld strength, and low dust generation.

The ball bearing sliding part may be used for parts that are in dynamic contact with ball bearings, and may be used, as a non-limited example, for lens holders of camera modules.

Hereinafter, specific examples are presented. However, the examples described below are only intended to specifically illustrate or explain the embodiments, and the scope of the embodiments are not limited thereto.

PREPARATION EXAMPLES

Example 1: Preparation of Liquid Crystalline Resin Composition

Within contents shown in Table 1 below, a liquid crystalline resin (SEYANG® LCP G600BB resin), BaSO$_4$ (0.4 µm to 1.5 µm, median diameter: 0.5 µm to 1.0 µm), multi-walled carbon nanotubes (MWCNT) (5 nm to 20 nm, median diameter: 11 nm to 13 nm, length: 40 µm to 100 µm, median length: 40 µm to 50 µm), mica (median diameter: 10 µm to 60 µm), an olefin-based copolymer, carbon black, and MoS$_2$ are mixed and then melted and kneaded in a twin screw extruder (L/D: 44, diameter: 30 mm). During the melt kneading, a barrel temperature of the extruder is set at 340° C., and by-products are removed through vacuum conditions.

A liquid crystalline resin composition prepared through the melting and kneading is mixed in a mixer for 30 minutes and dried in a hot air drier at 150° C. for 2 hours.

Comparative Example

As shown in Table 1 below, a liquid crystalline resin composition is prepared in the same manner as in Example 1 except that components and contents thereof are changed.

Experimental Examples: Measurement of Physical Properties of Liquid Crystalline Resin Composition The liquid crystalline resin compositions of the examples and the comparative examples are measured with respect to drop/abrasion deformation values with a 3D microscope, and the results are shown in Table 1 below.

Figure 2:
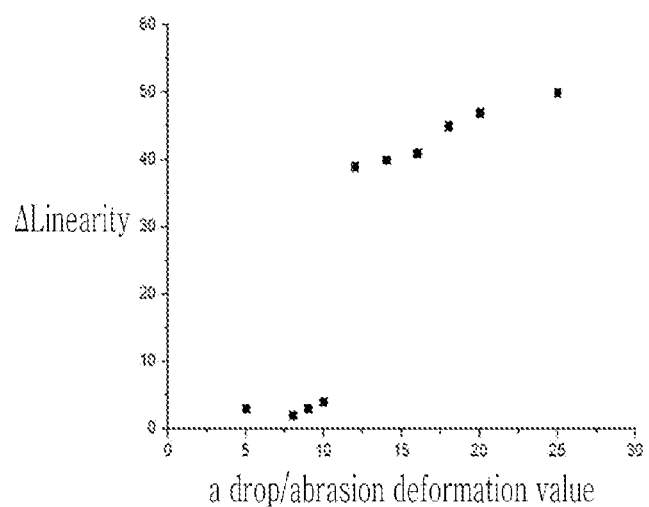
FIG. 2 is a graph showing a correlation between a drop/abrasion deformation value and a driving performance value (Linearity), in accordance with one or more embodiments.

Additionally, a correlation of the drop/abrasion deformation values with driving performance values (Stroke and Linearity) is calculated, and the results are shown in FIGS. 1 and 2.

The correlation between the drop/abrasion deformation values and the driving performance values (Stroke and Linearity) is obtained by performing a drop experiment and a drive performance evaluation as follows.

Before inputting a ball bearing sliding part into the drop experiment, the ball bearing sliding part should be measured with respect to an initial driving performance value, wherein this driving performance value is measured by obtaining actual driving data with a position sensor through full sweep driving of the ball bearing sliding part within the whole driving range. In the one or more examples, Stroke is a maximum driving distance calculated therefrom, and Linearity is linearity of driving characteristics calculated therefrom. After measuring the initial driving performance, the ball bearing part is put in drop equipment to repeatedly conduct the drop experiment and remeasure it with respect to driving performance values in the same method as the method of measuring the initial driving performance, and then disassembled to measure a maximum drop/abrasion deformation value by using measuring equipment (3D microscope and the like).

TABLE 1

|  | Comp. Ex. 1 | Ex. 1 | Ex. 2 | Ex. 3 | Ex. 4 | Ex. 5 | Ex. 6 | Comp. Ex. 2 | Comp. Ex. 3 | Comp. Ex. 4 |
|---|---|---|---|---|---|---|---|---|---|---|
| Liquid crystalline resin (wt %) | 75.3 | 74.8 | 74.3 | 73.8 | 73.3 | 71.3 | 67.3 | 63.3 | 60.3 | 56.3 |
| Olefin-based copolymer (wt %) | 7.7 | 7.7 | 7.7 | 7.7 | 7.7 | 7.7 | 7.7 | 7.7 | 7.7 | 7.7 |
| Fine particulate filler (wt %) | 5 | 7 | 7 | 7 | 7 | 10 | 14 | 18 | 21 | 25 |
| Sheet-shaped filler (wt %) | 4 | 4 | 4 | 4 | 4 | 4 | 4 | 4 | 4 | 4 |
| Nanofiller (wt %) | 2 | 0.5 | 1 | 1.5 | 2 | 1 | 1 | 1 | 1 | 1 |
| Abrasive filler (wt %) | 1 | 1 | 1 | 1 | 1 | 1 | 1 | 1 | 1 | 1 |
| Carbon-based filler (wt %) | 5 | 5 | 5 | 5 | 5 | 5 | 5 | 5 | 5 | 5 |
| Total (wt %) | 100 | 100 | 100 | 100 | 100 | 100 | 100 | 100 | 100 | 100 |
| Fine particulate filler + nanofiller (wt %) | 6 | 7.5 | 8 | 8.5 | 9 | 11 | 15 | 19 | 22 | 26 |
| Nanofiller/(fine | 33 | 7 | 13 | 18 | 22 | 9 | 7 | 5 | 5 | 4 |

TABLE 1-continued

|  | Comp. Ex. 1 | Ex. 1 | Ex. 2 | Ex. 3 | Ex. 4 | Ex. 5 | Ex. 6 | Comp. Ex. 2 | Comp. Ex. 3 | Comp. Ex. 4 |
|---|---|---|---|---|---|---|---|---|---|---|
| particulate filler + nanofiller) (wt %) |  |  |  |  |  |  |  |  |  |  |
| Drop/abrasion deformation values (μm) | 13 | 9 | 5 | 8 | 9 | 7 | 9 | 13 | 16 | 20 | liquid crystalline resin: SEYANG® LCP G600BB resin
fine particulate filler: BaSO$_4$ (0.4 μm to 1.5 μm)
sheet-shaped filler: mica
nanofiller: MWCNT (diameter: 5 nm to 20 nm)
abrasive filler: MoS$_2$
carbon-based filler: carbon black Referring to FIGS. 1 and 2, when liquid crystalline resin compositions have a drop/abrasion deformation value of less than or equal to 10 μm, driving performance values thereof may be significantly increased, wherein the example embodiments exhibit a drop/abrasion deformation value of less than or equal to 10 μm and thus an excellent driving performance value.

While this disclosure includes specific examples, it will be apparent to one of ordinary skill in the art, after an understanding of the disclosure, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A liquid crystalline resin composition, comprising:
 a liquid crystalline resin;
 a fine particulate filler; and
 a nanofiller,
 wherein the fine particulate filler includes barium sulfate (BaSO$_4$) and the nanofiller includes carbon nanotubes (CNT), and
 wherein a content of the nanofiller based on a total weight of the fine particulate filler and the nanofiller is about 6 wt % to about 30 wt %.

2. The liquid crystalline resin composition of claim 1, wherein:
 the liquid crystalline resin composition comprises the liquid crystalline resin in an amount of about 60 wt % to about 85 wt % based on a total weight of the liquid crystalline resin composition.

3. The liquid crystalline resin composition of claim 1, wherein:
 the liquid crystalline resin composition comprises the fine particulate filler and the nanofiller in an amount of about 7.5 wt % to about 15 wt % based on a total weight of the liquid crystalline resin composition.

4. The liquid crystalline resin composition of claim 1, wherein:
 a median diameter of the fine particulate filler is about 0.4 μm to about 1.5 μm.

5. The liquid crystalline resin composition of claim 1, wherein:
 the fine particulate filler comprises silica, quartz powders, glass beads, glass powders, calcium silicate, aluminum silicate, potassium aluminum silicate, kaolin, clay, diatomite, wollastonite, iron oxide, titanium oxide, zinc oxide, alumina, calcium carbonate, magnesium carbonate, calcium sulfate, silicon carbide, silicon nitride, boron nitride, potassium titanate, calcium pyrophosphate, anhydrous dibasic calcium phosphate, or a combination thereof.

6. The liquid crystalline resin composition of claim 1, wherein:
 the nanofiller has a median diameter of about 5 nm to about 20 nm, and a length of about 40 μm to about 100 μm.

7. The liquid crystalline resin composition of claim 1, wherein:
 the liquid crystalline resin composition further comprises a sheet-shaped filler in an amount of about 1 wt % to about 30 wt % based on a total weight of the liquid crystalline resin composition.

8. The liquid crystalline resin composition of claim 7, wherein:
 the sheet-shaped filler comprises mica, glass flakes, metal flakes, or a combination thereof.

9. The liquid crystalline resin composition of claim 7, wherein:
 a median diameter of the sheet-shaped filler is about 10 μm to about 60 μm.

10. The liquid crystalline resin composition of claim 1, wherein:
 the liquid crystalline resin composition further comprises an olefin-based copolymer in an amount of about 2 wt % to about 15 wt % based on a total weight of the liquid crystalline resin composition.

11. The liquid crystalline resin composition of claim 10, wherein:
 the olefin-based copolymer is a copolymer comprising a repeating unit derived from an α-olefin and a repeating unit derived from a glycidyl ester of an α,β-unsaturated acid.

12. The liquid crystalline resin composition of claim 1, wherein:
 the liquid crystalline resin composition further comprises a carbon-based filler in an amount of about 0.5 wt % to about 5 wt % based on a total weight of the liquid crystalline resin composition.

13. The liquid crystalline resin composition of claim 12, wherein:
the carbon-based filler comprises carbon black.

14. The liquid crystalline resin composition of claim 1, wherein:
the liquid crystalline resin composition further comprises an abrasive filler including molybdenum disulfide ($MoS_2$), molybdenum diselenide ($MoSe_2$), molybdenum sulfide selenide (MoSSe), molybdenum trioxide ($MoO_3$), tungsten disulfide ($WS_2$), tungsten selenide ($WSe_2$), tungsten selenide sulfide (WSSe), tungsten trioxide ($MoO_3$), or a combination thereof in an amount of about 0.5 wt % to about 5 wt % based on a total weight of the liquid crystalline resin composition.

15. A ball bearing sliding part manufactured by implementing the liquid crystalline resin composition of claim 1.

* * * * *